US012795054B2

(12) United States Patent
Cheng et al.

(10) Patent No.: US 12,795,054 B2
(45) Date of Patent: Nov. 10, 2026

(54) PROJECTION DEVICE AND LIGHT SOURCE SYSTEM THEREOF

(71) Applicant: Coretronic Corporation, Hsin-Chu (TW)

(72) Inventors: Chun-Hsin Cheng, Hsin-Chu (TW); Ying-Chieh Yeh, Hsin-Chu (TW); Kung-Wei Chuang, Hsin-Chu (TW); Hsin-Chang Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/923,700

(22) Filed: Oct. 23, 2024

(65) Prior Publication Data

US 2025/0142027 A1 May 1, 2025

(30) Foreign Application Priority Data

Oct. 25, 2023 (CN) ......................... 202311388330.8

(51) Int. Cl.
*H04N 9/31* (2006.01)
*G09G 3/00* (2006.01)

(52) U.S. Cl.
CPC ........... *H04N 9/3123* (2013.01); *G09G 3/001* (2013.01); *H04N 9/315* (2013.01)

(58) Field of Classification Search
CPC .... H04N 9/3123; H04N 9/315; H04N 9/3155; G09G 3/001; G03B 21/2013; G03B 21/2033; G03B 21/206; H05B 45/325; H05B 45/37; H05B 47/155; H05B 47/165
See application file for complete search history.

(56) References Cited

U.S. PATENT DOCUMENTS

| | | | | |
|---|---|---|---|---|
| 11,215,913 B2 * | 1/2022 | Wu | G03B 21/006 |
| 11,323,668 B2 * | 5/2022 | Chang | H04N 9/3111 |
| 11,369,014 B2 | 6/2022 | Chang et al. | |
| 2010/0283322 A1 * | 11/2010 | Wibben | H02M 3/158 307/31 |
| 2012/0019785 A1 * | 1/2012 | Tseng | G03B 21/2013 353/121 |
| 2018/0259838 A1 * | 9/2018 | Wu | G03B 21/2053 |
| 2020/0249556 A1 * | 8/2020 | Wu | G03B 21/006 |
| 2023/0300302 A1 * | 9/2023 | Huang | H04N 9/3158 345/204 |

(Continued)

FOREIGN PATENT DOCUMENTS

| | | |
|---|---|---|
| CN | 109634042 | 4/2019 |
| CN | 110187597 | 8/2019 |

(Continued)

*Primary Examiner* — Ricardo Osorio
(74) *Attorney, Agent, or Firm* — JCIPRNET

(57) ABSTRACT

In a projection device and a light source system thereof, the light source system includes a light source module, a driver, and a control circuit. The light source module includes light sources to provide beams with different wavelength ranges. According to a selection signal, the control circuit selects one of a first pulse width modulation signal, a second pulse width modulation signal, and a third pulse width modulation signal as a pulse width modulation signal to output to the driver. The driver drives the light source corresponding to the selection signal with the pulse width modulation signal provided by the control circuit.

16 Claims, 5 Drawing Sheets

(56) References Cited

U.S. PATENT DOCUMENTS

| | | | | |
|---|---|---|---|---|
| 2023/0409497 | A1 * | 12/2023 | Pulliam | G06F 13/1668 |
| 2024/0298392 | A1 * | 9/2024 | Tsai | F21V 23/06 |
| 2025/0301107 | A1 * | 9/2025 | Gao | G03B 21/20 |

FOREIGN PATENT DOCUMENTS

| | | | | | |
|---|---|---|---|---|---|
| CN | 110609453 | A | * | 12/2019 | G03F 7/70291 |
| CN | 113934094 | A | * | 1/2022 | G03B 21/2013 |
| CN | 114995037 | | | 9/2022 | |
| CN | 115437203 | | | 12/2022 | |
| WO | WO-2016033828 | | * | 3/2016 | H05B 47/10 |

* cited by examiner

PROJECTION DEVICE AND LIGHT SOURCE SYSTEM THEREOF

CROSS-REFERENCE TO RELATED APPLICATION

This application claims the priority benefit of China application serial no. 202311388330.8 filed on Oct. 25, 2023. The entirety of the above-mentioned patent application is hereby incorporated by reference herein and made a part of this specification.

BACKGROUND

Technical Field

The disclosure relates to a display device, and particularly, to a projection device and a light source system thereof.

Related Art

Generally, the projector includes three drive circuits to respectively drive a red (R) light source, a green (G) light source, and a blue (B) light source in a light source module. When additional light source modules are added to increase brightness, it will be required to correspondingly add drive circuits. For example, one light source module including three light sources such as a red light source, a green light source, and a blue light source requires three drive circuits for driving. If the quantity of light source modules is increased to two, then six drive circuits are required for driving. This will increase the area of the circuit board or the volume of the product, complicate the circuit, and also increase the manufacturing cost of the product.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

A light source system of a projection device according to the disclosure is configured to provide an illumination beam. The light source system includes a light source module, a driver, and a control circuit. The light source module includes a first light source, a second light source, and a third light source. The first light source, the second light source, and the third light source are respectively configured to provide a first beam, a second beam, and a third beam. The first beam, the second beam, and the third beam have wavelength ranges different from each other. The driver is coupled to the light source module and is configured to drive the light source module. The control circuit is coupled to the driver and outputs a pulse width modulation signal to the driver according to a selection signal. The pulse width modulation signal is one of a first pulse width modulation signal, a second pulse width modulation signal, and a third pulse width modulation signal received by the control circuit. The driver drives one of the first light source, the second light source, and the third light source that corresponds to the selection signal with the pulse width modulation signal. The illumination beam includes one of the first beam, the second beam, and the third beam.

A projection device according to the disclosure includes a light source system, at least one light valve, and a projection lens. The light source system is configured to provide an illumination beam. The light valve is arranged on a transmission path of the illumination beam from the light source system and is configured to convert the illumination beam into an image beam. The projection lens is arranged on a transmission path of the image beam and is configured to project the image beam out of the projection device. The light source system includes a light source module, a driver, and a control circuit. The light source module includes a first light source, a second light source, and a third light source. The first light source, the second light source, and the third light source are respectively configured to provide a first beam, a second beam, and a third beam. The first beam, the second beam, and the third beam have wavelength ranges different from each other. The driver is coupled to the light source module and is configured to drive the light source module. The control circuit is coupled to the driver and outputs a pulse width modulation signal to the driver according to a selection signal. The pulse width modulation signal is one of a first pulse width modulation signal, a second pulse width modulation signal, and a third pulse width modulation signal received by the control circuit. The driver drives one of the first light source, the second light source, and the third light source that corresponds to the selection signal with the pulse width modulation signal. The illumination beam includes one of the first beam, the second beam, and the third beam.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

DESCRIPTION OF EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The disclosure provides a projection device and a light source system thereof capable of effectively avoiding an increase in the area of a circuit board or the volume of a product, simplifying the circuit, and thus reducing the manufacturing cost of the product. Other objectives and advantages of the disclosure may be further learned from the technical features disclosed herein.

Figure 1:
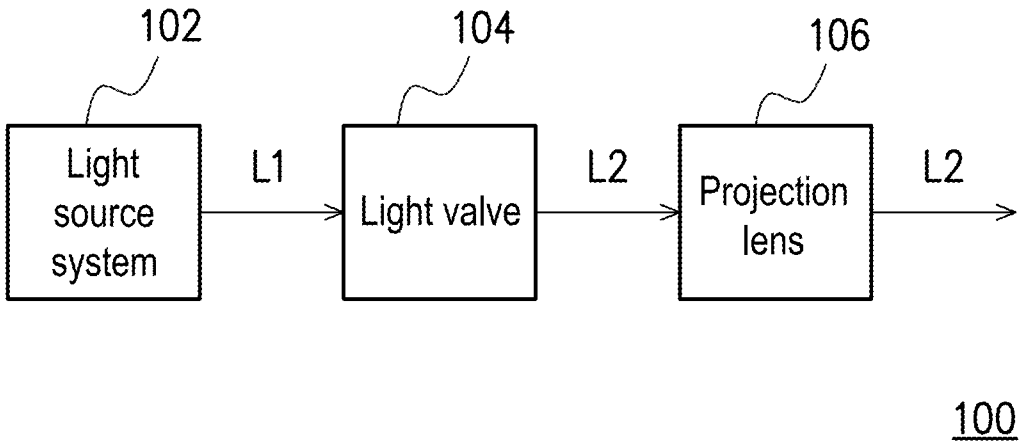
FIG. 1 is a schematic view of a projection device according to an embodiment of the disclosure.

FIG. 1 is a schematic view of a projection device according to an embodiment of the disclosure. Referring to FIG. 1, a projection device 100 may include a light source system 102, at least one light valve 104, and a projection lens 106. The light source system 102 is configured to provide an illumination beam L1. The light valve 104 is arranged on the transmission path of the illumination beam L1 from the light source system 102, and is configured to convert the illumination beam L1 into an image beam L2. The projection lens 106 is arranged on the transmission path of the image beam L2, and is configured to project the image beam L2 out of the projection device 100.

Figure 2:
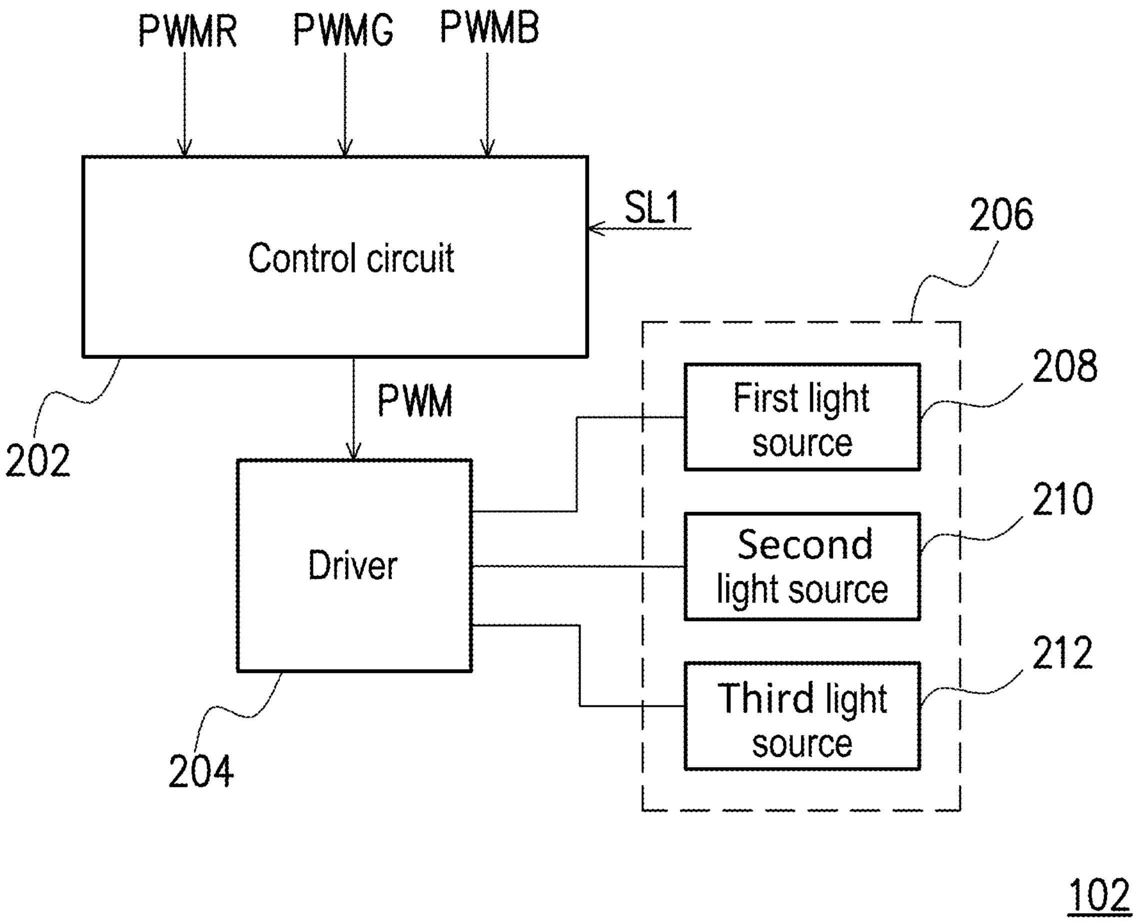
FIG. 2 is a schematic view of a light source system of the projection device according to an embodiment of the disclosure.

Further, as shown in FIG. 2, the light source system 102 may include a control circuit 202, a driver 204, and a light source module 206. The driver 204 is coupled to the control circuit 202 and the light source module 206. The light source module 206 may include a first light source 208, a second light source 210, and a third light source 212 of different colors of light. The first light source 208, the second light source 210, and the third light source 212 may respectively provide a first beam, a second beam, and a third beam with different wavelength ranges. The illumination beam L1 includes at least one of the first beam, the second beam, and the third beam.

The driver 204 is configured to drive the light source module 206. According to a selection signal SL1, the control circuit 202 may select one of a first pulse width modulation signal PWMR, a second pulse width modulation signal PWMG, and a third pulse width modulation signal PWMB as a pulse width modulation signal PWM to be outputted to the driver 204. The selection signal SL1 may be provided by a processor of the projection device 100 such as a DLP data processor (DDP), but the disclosure is not limited thereto. The driver 204 may drive the light source corresponding to the selection signal SL1 (i.e., one of the first light source 208, the second light source 210, and the third light source 212) with the pulse width modulation signal PWM from the control circuit 202. For example, if the pulse width modulation signal and the light source corresponding to the selection signal SL1 are respectively the second pulse width modulation signal PWMG and the second light source 210, according to the selection signal SL1, the control circuit 202 may select to output the second pulse width modulation signal PWMG as the pulse width modulation signal PWM, and the driver 204 may drive the second light source 210 with the pulse width modulation signal PWM.

In this manner, with the control circuit 202 and the driver 204 switching the light source to be driven according to the selection signal SL1, it is possible to respectively drive the first light source 208, the second light source 210, and the third light source 212 in the light source module 206 by using one driver 204 coupled to the light source module 206. Thus, it is possible to reduce the quantity of drivers or drive circuits used, effectively avoid an increase in the area of the circuit board or the volume of the product, simplify the circuit, and thus reduce the manufacturing cost of the product.

Figure 3:
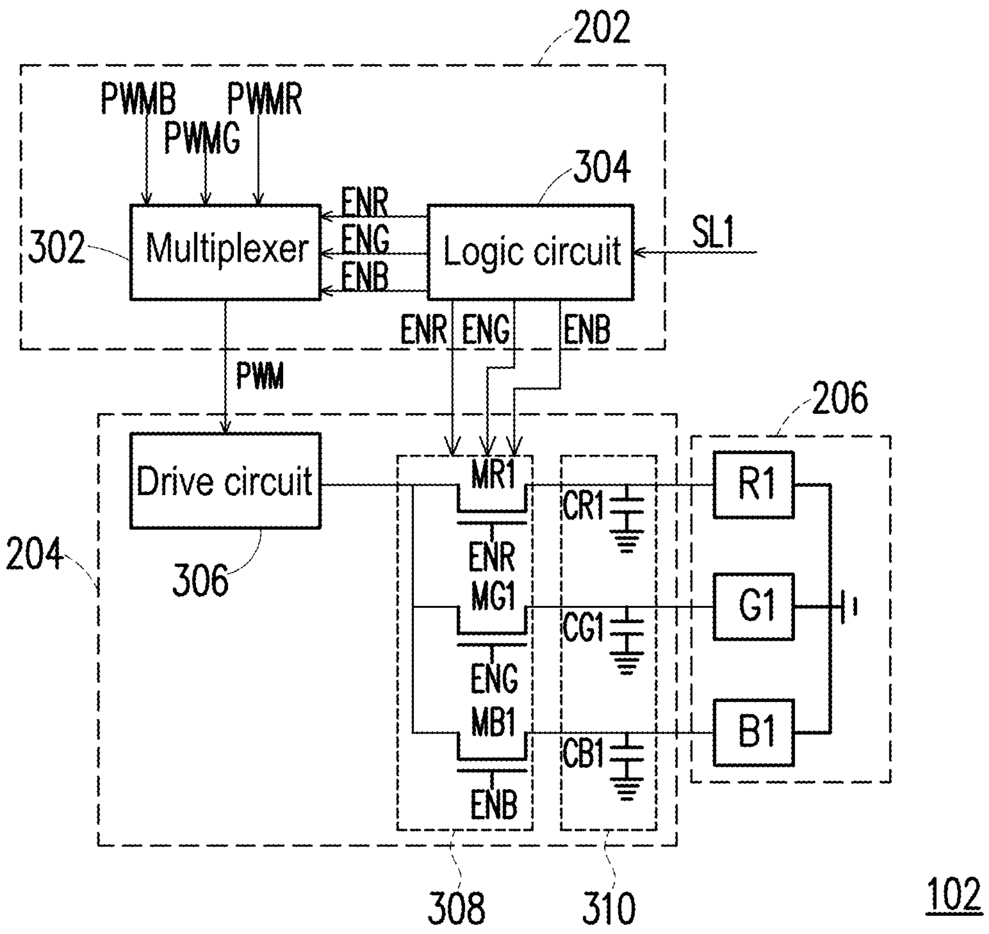
FIG. 3 is a schematic view of the light source system of the projection device according to another embodiment of the disclosure.

Specifically, an implementation of the light source system 102 may be as shown in FIG. 3, in which the control circuit 202 includes a multiplexer 302 and a logic circuit 304, the driver 204 includes a drive circuit 306, a switching circuit 308, and a smoothing circuit 310. In this embodiment, the first light source 208, the second light source 210, and the third light source 212 shown in FIG. 2 are respectively implemented as a red light source R1, a green light source G1, and a blue light source B1 of the light source module 206 in FIG. 3. The red light source R1, the green light source G1, and the blue light source B1 may be solid-state lighting electronic components. For example, each of the light sources may be one or more light-emitting diodes (LEDs), one or more laser diodes (LDs), or a combination of LEDs and LDs, but the disclosure is not limited thereto. Furthermore, the quantities of the solid-state lighting electronic components used in the first light source 208, the second light source 210, and the third light source 212 are not particularly limited and may be different from each other. In this embodiment, the first light source 208 includes four solid-state lighting electronic components that generate red light to form the red light source R1, the second light source 210 includes two solid-state lighting electronic components that generate blue light to form the blue light source B1, and the third light source 212 includes three solid-state lighting electronic components that generate green light to form the green light source G1.

The logic circuit 304 is configured to receive the selection signal SL1 and generate a first enable signal ENR, a second enable signal ENG, and a third enable signal ENB according to the selection signal SL1. The multiplexer 302 is coupled to the logic circuit 304 and may select one of the first pulse width modulation signal PWMR, the second pulse width modulation signal PWMG, and the third pulse width modulation signal PWMB as the pulse width modulation signal PWM according to the first enable signal ENR, the second enable signal ENG, and the third enable signal ENB, and output the pulse width modulation signal PWM to the drive circuit 306 of the driver 204. The selection signal SL1 may be sent by the processor of the projection device and may be, for example, a two-bit control signal. In this embodiment, the signals may be, for example, as shown in Table 1 and Table 2 below, but the disclosure is not limited thereto.

Table 1 is a table showing voltage levels of the first enable signal ENR, the second enable signal ENG, and the third enable signal ENB corresponding to the selection signal SL1.

TABLE 1

| Selection signal SL1 | | Voltage level | | |
|---|---|---|---|---|
| | | First enable signal ENR | Second enable signal ENG | Third enable signal ENB |
| 0 | 0 | 0 | 0 | 0 |
| 0 | 1 | 1 | 0 | 0 |
| 1 | 0 | 0 | 1 | 0 |
| 1 | 1 | 0 | 0 | 1 |

Table 2 is a table showing voltage levels of the first enable signal ENR, the second enable signal ENG, and the third enable signal ENB corresponding to the pulse width modulation signal PWM.

TABLE 2

| Voltage level | | | Pulse width |
|---|---|---|---|
| First enable signal ENR | Second enable signal ENG | Third enable signal ENB | modulation signal PWM |
| High | Low | Low | PWMR |
| Low | High | Low | PWMG |
| Low | Low | High | PWMB |

When the selection signal SL1 is "0" and "0", the logic circuit 304 may correspondingly output the first enable signal ENR, the second enable signal ENG, and the third enable signal ENB at the low voltage level, and at this time, the multiplexer 302 does not output the pulse width modulation signal PWM. When the selection signal SL1 is "0" and "1", the logic circuit 304 may correspondingly output the first enable signal ENR at the high voltage level and the second enable signal ENG and the third enable signal ENB at the low voltage level. The multiplexer 302 may then select the first pulse width modulation signal PWMR as the pulse width modulation signal PWM according to the first enable signal ENR at the high voltage level. Similarly, when the selection signal SL1 is "1" and "0" and when the selection signal SL1 is "1" and "1", the logic circuit 304 may respectively correspondingly output the second enable signal ENG and the third enable signal ENB at the high voltage level. The multiplexer 302 may select the second pulse width modulation signal PWMG and the third pulse width modulation signal PWMB as the pulse width modulation signal PWM respectively according to the second enable signal ENG and the third enable signal ENB at the high voltage level.

The drive circuit 306 may receive the pulse width modulation signal PWM provided by the multiplexer 302 of the control circuit 202, and drive the red light source R1, the green light source G1, or the blue light source B1 in the light source module 206 with the pulse width modulation signal PWM. Furthermore, the switching circuit 308 is coupled to the drive circuit 306 and the logic circuit 304, and may switch the connection of the drive circuit 306 to one of the first light source 208 (i.e., the red light source R1), the second light source 210 (i.e., the green light source G1), and the third light source 212 (i.e., the blue light source B1) according to the first enable signal ENR, the second enable signal ENG, and the third enable signal ENB from the logic circuit 304, to thus cause the drive circuit 306 to output the pulse width modulation signal PWM to one of the first light source 208 (i.e., the red light source R1), the second light source 210 (i.e., the green light source G1), and the third light source 212 (i.e., the blue light source B1) that corresponds to the selection signal SL1 to perform driving. In addition, one terminal of the smoothing circuit 310 is coupled to the switching circuit 308 and the light source module 206 to smooth the voltage outputted by the switching circuit 308 and stabilize emission of light of the first light source 208 (i.e., the red light source R1), the second light source 210 (i.e., the green light source G1), and the third light source 212 (i.e., the blue light source B1). In some embodiments, it is also possible that the driver 204 does not include the smoothing circuit 310.

Furthermore, the switching circuit 308 may include, for example, a first switch MR1, a second switch MG1, and a third switch MB1. The first switch MR1 is coupled between the drive circuit 306 and the first light source 208 (i.e., the red light source R1), the second switch MG1 is coupled between the drive circuit 306 and the second light source 210 (i.e., the green light source G1), and the third switch MB1 is coupled between the drive circuit 306 and the third light source 212 (i.e., the blue light source B1). The conducting states of the first switch MR1, the second switch MG1, and the third switch MB1 are respectively controlled by the first enable signal ENR, the second enable signal ENG, and the third enable signal ENB outputted by the logic circuit 304. By conducting one of the first switch MR1, the second switch MG1, and the third switch MB1, the connection of the drive circuit 306 is switched to one of the first light source 208 (i.e., the red light source R1), the second light source 210 (i.e., the green light source G1), and the third light source 212 (i.e., the blue light source B1). For example, when the first enable signal ENR is at the high voltage level, the first switch MR1 is controlled by the first enable signal ENR and is turned to conducting state, and the second switch MG1 and the third switch MB1 remain in non-conducting state, so the connection of the drive circuit 306 can be switched to the first light source 208 (i.e., the red light source R1). At this time, by switching the conduction in this manner, the pulse width modulation signal PWM provided by the multiplexer 302 to the drive circuit 306 can be further outputted to the first light source 208 (i.e., the red light source R1) to perform driving and light up the red solid-state lighting electronic components in the light source module 206.

In addition, the smoothing circuit 310 may include a first capacitor CR1, a second capacitor CG1, and a third capacitor CB1. The first capacitor CR1 is coupled between the first switch MR1 and the ground voltage, the second capacitor CG1 is coupled between the second switch MG1 and the ground voltage, and the third capacitor CB1 is coupled between the third switch MB1 and the ground voltage. The first capacitor CR1, the second capacitor CG1, and the third capacitor CB1 may be respectively configured to smooth the voltages provided by the first switch MR1, the second switch MG1, and the third switch MB1. Specifically, the first capacitor CR1, the second capacitor CG1, and the third capacitor CB1 mainly serve to reduce a current ripple. Meanwhile, when any one of the first switch MR1, the second switch MG1, and the third switch MB1 is in non-conducting state, if there is still current in the corresponding circuit that has not been completely discharged, the corresponding light source (e.g., one of the first light source 208, the second light source 210, and the third light source 212) may emit light while it should be off. Considering the above, the corresponding capacitance values may be designed respectively according to the quantities of solid-state lighting electronic components used in the first light source 208, the second light source 210, and the third light source 212. In this embodiment, the first light source 208 includes four red laser diodes, the second light source 210 includes two blue laser diodes, and the third light source 212 includes three green laser diodes. The capacitance value of the first capacitor CR1 may be 5 μF to 8 μF, the capacitance value of the second capacitor CG1 may be 3 μF to 6 μF, and the capacitance value of the third capacitor CB1 may be 8 μF to 11 μF.

Figure 4:
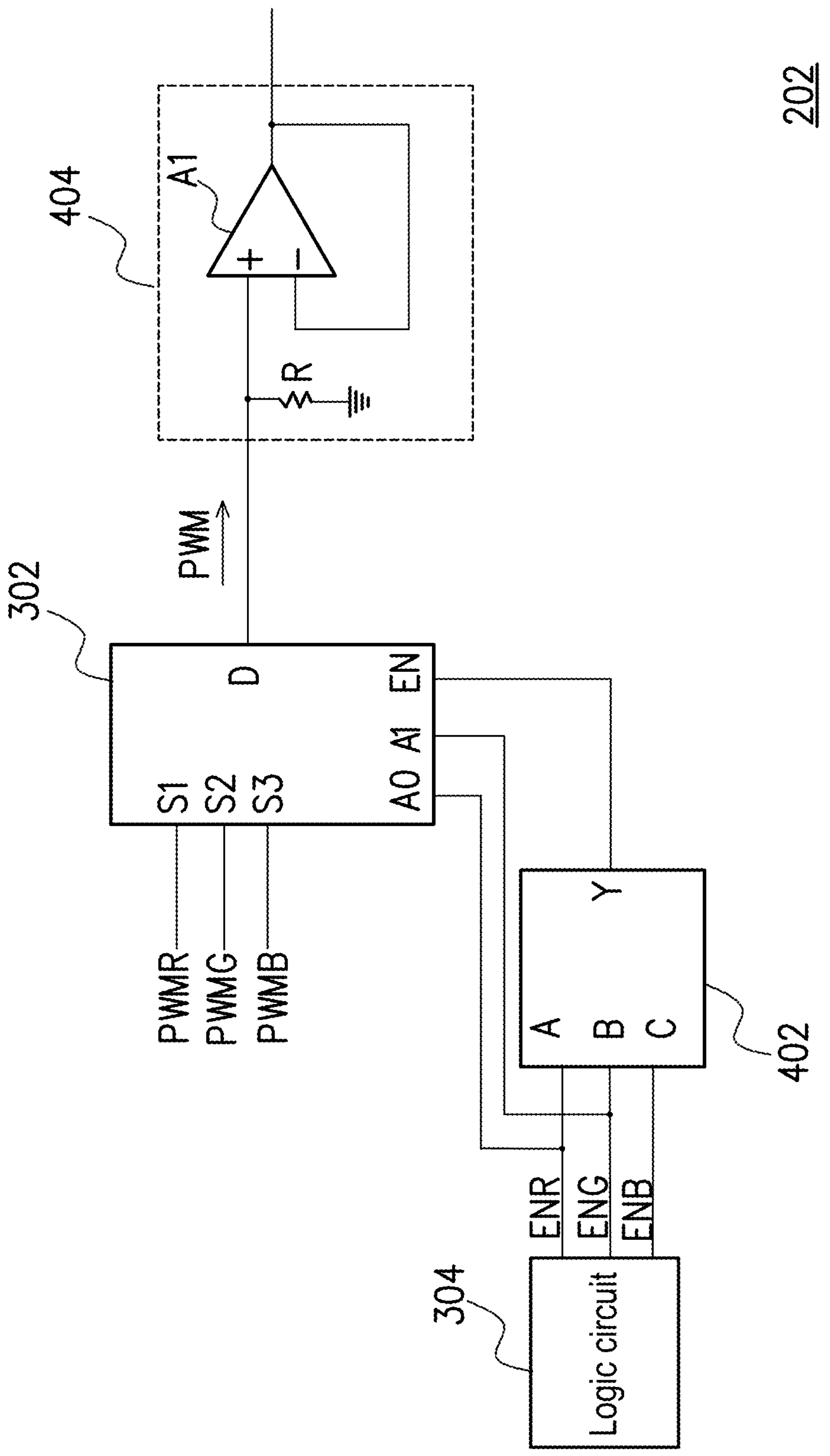
FIG. 4 is a schematic view of a control circuit according to an embodiment of the disclosure.

In other embodiments, the control circuit 202 may further include an OR gate and a non-inverting amplifier. For example, in the embodiment shown in FIG. 4, an OR gate 402 is coupled between the logic circuit 304 and the multiplexer 302, and a non-inverting amplifier 404 is coupled between the multiplexer 302 and the driver 204 (not shown in FIG. 4). In this embodiment, input terminals A, B, and C of the OR gate 402 are respectively configured to receive the first enable signal ENR, the second enable signal ENG, and the third enable signal ENB, and an output terminal Y of the OR gate 402 is coupled to an enable input terminal EN of the multiplexer 302. Input terminals S1 to S3 of the multiplexer 302 respectively receive the first pulse width modulation signal PWMR, the second pulse width modulation signal PWMG, and the third pulse width modulation signal PWMB, and selection input terminals A0 and A1 of the multiplexer 302 respectively receive the first enable signal ENR and the second enable signal ENG. The non-inverting amplifier 404 may include a resistor R and an operational amplifier A1. A positive input terminal of the operational amplifier A1 is coupled to an output terminal D of the multiplexer 302, a negative input terminal and an output terminal of the operational amplifier A1 are connected to each other, the output terminal of the operational amplifier A1 is coupled to the drive circuit 306 (not shown in FIG. 4) of the driver 204 in FIG. 3, and the resistor R is coupled between the positive input terminal of the operational amplifier A1 and the ground.

The OR gate 402 may enable the multiplexer 302 according to the first enable signal ENR, the second enable signal ENG, and the third enable signal ENB. For example, when any one of the first enable signal ENR, the second enable signal ENG, and the third enable signal ENB is at the high voltage level, the OR gate 402 outputs, via the output terminal Y, the enable signal at the high voltage level to the enable input terminal EN of the multiplexer 302 to enable the multiplexer 302. According to the first enable signal ENR and the second enable signal ENG respectively received by the selection input terminals A0 and A1, the multiplexer 302 may select one of the first pulse width modulation signal PWMR, the second pulse width modulation signal PWMG, and the third pulse width modulation signal PWMB as the pulse width modulation signal PWM to be outputted. For example, when the first enable signal ENR and the second enable signal ENG respectively received by the selection input terminals A0 and A1 of the multiplexer 302 are both at the low voltage level, the third pulse width modulation signal PWMB is outputted. When the first enable signal ENR received by the selection input terminal A0 of the multiplexer 302 is at the high voltage level and the second enable signal ENG received by the selection input terminal A1 is at the low voltage level, the first pulse width modulation signal PWMR is outputted. When the first enable signal ENR received by the selection input terminal A0 of the multiplexer 302 is at the low voltage level and the second enable signal ENG received by the selection input terminal A1 is at the high voltage level, the second pulse width modulation signal PWMG is outputted. However, the disclosure is not limited thereto. The function of the non-inverting amplifier 404 is to isolate the circuit to prevent resistances of the front-end circuit and the back-end circuit from affecting each other and thus affecting the voltage value accuracy of the pulse width modulation signal PWM and to reduce noise at the same time. The non-inverting amplifier 404 may amplify the pulse width modulation signal PWM provided by the multiplexer 302 and provide to the drive circuit 306 of the driver 204.

Figure 5:
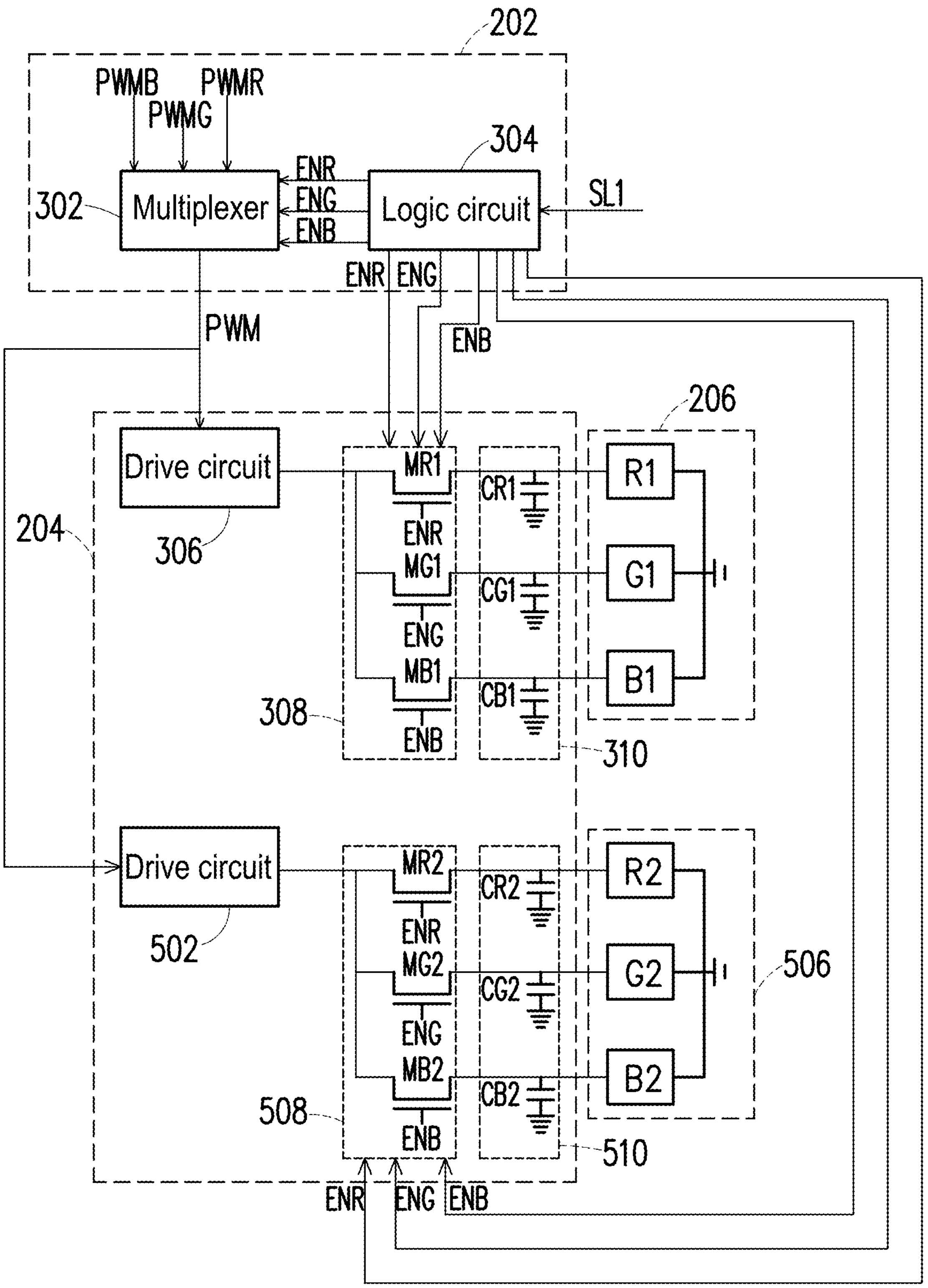
FIG. 5 is a schematic view of a light source system of a projection device according to another embodiment of the disclosure.

The above embodiment has been described with the light source system including one light source module as an example. However, in other embodiments, the light source system may also include a plurality of light source modules. For example, as shown in FIG. 5, the light source system includes a plurality of light source modules 206 and 506. In addition, corresponding to the light source modules 206 and 506, the driver 204 further includes a plurality of drive circuits 306 and 502, a plurality of switching circuits 308 and 508, and a plurality of smoothing circuits 310 and 510. The light source module 506 is similar to the light source module 206 in FIG. 3, and may include a first light source (i.e., a red light source R2), a second light source (i.e., a green light source G2), and a third light source (i.e., a blue light source B2). The switching circuit 508 is coupled to the light source module 506 and the drive circuit 502. The switching circuit 508 is similar to the switching circuit 308 in FIG. 3, and may include, for example, a first switch MR2, a second switch MG2, and a third switch MB2. The smoothing circuit 510 is similar to the smoothing circuit 310 in FIG. 3, and may include a first capacitor CR2, a second capacitor CG2, and a third capacitor CB2. Similarly, the switching circuit 508 may also be controlled by the first enable signal ENR, the second enable signal ENG, and the third enable signal ENB to connect the drive circuit 502 to the light source corresponding to the selection signal SL1 to perform light source driving. Since the implementation details of the drive circuit 502, the light source module 506, the switching circuit 508, and the smoothing circuit 510 are similar to those of the drive circuit 306, the light source module 206, the switching circuit 308, and the smoothing circuit 310 in the above embodiment, the implementation details thereof will not be repeatedly described herein. In this embodiment, the drive circuits 306 and 502 are coupled to the corresponding light source modules 206 and 506, and the control circuit 202 is coupled to and outputs the pulse width modulation signal PWM to the drive circuits 306 and 502 in the driver 204 to simultaneously drive the light source modules 206 and 506. Furthermore, the drive circuits 306 and 502 may simultaneously receive the pulse width modulation signal PWM from the control circuit 202. According to the first enable signal ENR, the second enable signal ENG, and the third enable signal ENB, the switching circuits 308 and 508 switch the switches to connect to the light sources corresponding to the selection signal SL1 to simultaneously light up the light sources of the same color of light in the light source modules 206 and 506.

In summary of the above, the control circuit of the disclosure selects to output one of the first pulse width modulation signal, the second pulse width modulation signal, and the third pulse width modulation signal according to the selection signal, and the driver drives the light source corresponding to the selection signal with the pulse width modulation signal provided by the control circuit. In this manner, with the control circuit and the driver switching the light source to be driven according to the selection signal, it is possible to effectively avoid an increase in the area of the circuit board or the volume of the product, simplify the circuit, and thus reduce the manufacturing cost of the product.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from the disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A light source system of a projection device, the light source system being configured to provide an illumination beam and comprising:

- a light source module comprising a first light source, a second light source, and a third light source, wherein the first light source, the second light source, and the third light source are respectively configured to provide a first beam, a second beam, and a third beam, and the first beam, the second beam, and the third beam have wavelength ranges different from each other;
- a driver coupled to the light source module and configured to drive the light source module; and
- a control circuit coupled to the driver and outputting a pulse width modulation signal to the driver according to a selection signal, wherein the pulse width modulation signal is one of a first pulse width modulation signal, a second pulse width modulation signal, and a third pulse width modulation signal received by the control circuit, wherein
- the driver drives one of the first light source, the second light source, and the third light source that corresponds to the selection signal with the pulse width modulation signal, and the illumination beam comprises one of the first beam, the second beam, and the third beam,
- wherein the control circuit comprises:
- a logic circuit configured to receive the selection signal and generating a first enable signal, a second enable signal, and a third enable signal according to the selection signal;
- a multiplexer coupled to the logic circuit, selecting one of the first pulse width modulation signal, the second pulse width modulation signal, and the third pulse width modulation signal as the pulse width modulation signal according to the first enable signal, the second enable signal, and the third enable signal, and outputting the pulse width modulation signal to the driver; and
- an OR gate coupled between the logic circuit and the multiplexer, and receiving the first enable signal, the second enable signal, and the third enable signal to enable the multiplexer and cause the multiplexer to output the pulse width modulation signal.

2. The light source system of a projection device according to claim 1, wherein the selection signal is a two-bit control signal.

3. The light source system of a projection device according to claim 1, wherein the driver comprises:

- a drive circuit receiving the pulse width modulation signal provided by the control circuit; and
- a switching circuit coupled to the drive circuit and the logic circuit and switching a connection of the drive circuit to one of the first light source, the second light source, and the third light source according to the first enable signal, the second enable signal, and the third enable signal from the logic circuit to cause the drive circuit to output the pulse width modulation signal to one of the first light source, the second light source, and the third light source that corresponds to the selection signal to perform driving.

4. The light source system of a projection device according to claim 3, wherein the switching circuit comprises:

- a first switch coupled between the drive circuit and the first light source and having a conducting state changed under control of the first enable signal;
- a second switch coupled between the drive circuit and the second light source and having a conducting state changed under control of the second enable signal; and
- a third switch coupled between the drive circuit and the third light source and having a conducting state changed under control of the third enable signal.

5. The light source system of a projection device according to claim 4, further comprising:

- a smoothing circuit coupled to the switching circuit and configured to smooth a voltage outputted by the switching circuit, wherein the smoothing circuit comprises:
  - a first capacitor coupled between the first switch and a ground voltage;
  - a second capacitor coupled between the second switch and the ground voltage; and
  - a third capacitor coupled between the third switch and the ground voltage.

6. The light source system of a projection device according to claim 5, wherein the first light source is a red light source and a capacitance value of the first capacitor is 5 μF to 8 μF, the second light source is a green light source and a capacitance value of the second capacitor is 3 μF to 6 μF, and the third light source is a blue light source and a capacitance value of the third capacitor is 8 μF to 11 μF.

7. The light source system of a projection device according to claim 1, wherein the control circuit further comprises:

- a non-inverting amplifier coupled between the multiplexer and the driver and configured to amplify the pulse width modulation signal outputted by the multiplexer.

8. The light source system of a projection device according to claim 1, wherein the light source module is a plurality of light source modules, the driver comprises a plurality of drive circuits, each of the plurality of drive circuits is coupled to a corresponding light source module among the plurality of light source modules, and the control circuit is coupled to and outputs the pulse width modulation signal to the plurality of drive circuits to simultaneously drive each of the plurality of light source modules.

9. A projection device comprising a light source system, at least one light valve, and a projection lens, wherein the light source system is configured to provide an illumination beam, the at least one light valve is arranged on a transmission path of the illumination beam from the light source system and is configured to convert the illumination beam into an image beam, and the projection lens is arranged on a transmission path of the image beam and is configured to project the image beam out of the projection device, wherein the light source system comprises:

a light source module comprising a first light source, a second light source, and a third light source, wherein the first light source, the second light source, and the third light source are respectively configured to provide a first beam, a second beam, and a third beam, and the first beam, the second beam, and the third beam have wavelength ranges different from each other;

a driver coupled to the light source module and configured to drive the light source module; and a control circuit coupled to the driver and outputting a pulse width modulation signal to the driver according to a selection signal, wherein the pulse width modulation signal is one of a first pulse width modulation signal, a second pulse width modulation signal, and a third pulse width modulation signal received by the control circuit, wherein the driver drives one of the first light source, the second light source, and the third light source that corresponds to the selection signal with the pulse width modulation signal, and the illumination beam comprises one of the first beam, the second beam, and the third beam, wherein the control circuit comprises:

a logic circuit configured to receive the selection signal and generating a first enable signal, a second enable signal, and a third enable signal according to the selection signal;

a multiplexer coupled to the logic circuit, selecting one of the first pulse width modulation signal, the second pulse width modulation signal, and the third pulse width modulation signal as the pulse width modulation signal according to the first enable signal, the second enable signal, and the third enable signal, and outputting the pulse width modulation signal to the driver; and an OR gate coupled between the logic circuit and the multiplexer and receiving the first enable signal, the second enable signal, and the third enable signal to enable the multiplexer and cause the multiplexer to output the pulse width modulation signal.

10. The projection device according to claim 9, wherein the selection signal is a two-bit control signal.

11. The projection device according to claim 9, wherein the driver comprises:

a drive circuit receiving the pulse width modulation signal provided by the control circuit; and a switching circuit coupled to the drive circuit and switching a connection of the drive circuit to one of the first light source, the second light source, and the third light source according to the first enable signal, the second enable signal, and the third enable signal to cause the drive circuit to output the pulse width modulation signal to one of the first light source, the second light source, and the third light source that corresponds to the selection signal to perform driving.

12. The projection device according to claim 11, wherein the switching circuit comprises:

a first switch coupled between the drive circuit and the first light source and having a conducting state changed under control of the first enable signal;

a second switch coupled between the drive circuit and the second light source and having a conducting state changed under control of the second enable signal; and a third switch coupled between the drive circuit and the third light source and having a conducting state changed under control of the third enable signal.

13. The projection device according to claim 12, wherein the light source system comprises:

a smoothing circuit coupled to the switching circuit and configured to smooth a voltage outputted by the switching circuit, wherein the smoothing circuit comprises:

a first capacitor coupled between the first switch and a ground voltage;

a second capacitor coupled between the second switch and the ground voltage; and a third capacitor coupled between the third switch and the ground voltage.

14. The projection device according to claim 13, wherein the first light source is a red light source and a capacitance value of the first capacitor is 5 μF to 8 μF, the second light source is a green light source and a capacitance value of the second capacitor is 3 μF to 6 μF, and the third light source is a blue light source and a capacitance value of the third capacitor is 8 μF to 11 μF.

15. The projection device according to claim 9, wherein the control circuit further comprises:

a non-inverting amplifier coupled between the multiplexer and the driver and configured to amplify the pulse width modulation signal outputted by the multiplexer.

16. The projection device according to claim 9, wherein the light source module is a plurality of light source modules, the driver comprises a plurality of drive circuits, each of the plurality of drive circuits is coupled to a corresponding light source module among the plurality of light source modules, and the control circuit is coupled to and outputs the pulse width modulation signal to the plurality of drive circuits to simultaneously drive each of the plurality of light source modules.

* * * * *